United States Patent [19]
Sommer

[11] Patent Number: 5,915,285
[45] Date of Patent: Jun. 22, 1999

[54] TRANSPARENT STRAIN SENSITIVE DEVICES AND METHOD

[75] Inventor: Thomas R. Sommer, Sebastopol, Calif.

[73] Assignee: Optical Coating Laboratory, Inc., Santa Rose, Calif.

[21] Appl. No.: 08/006,928

[22] Filed: Jan. 21, 1993

[51] Int. Cl.⁶ ................................................. G01N 33/00
[52] U.S. Cl. .............................. 73/865.7; 338/2; 338/306
[58] Field of Search ........................... 73/865.7, 862.045, 73/862.046; 338/2, 5, 306

[56] References Cited

U.S. PATENT DOCUMENTS

| | | | |
|---|---|---|---|
| 4,361,114 | 11/1982 | Gurev | 118/723 |
| 4,399,015 | 8/1983 | Endo et al. | 204/298 |
| 4,476,463 | 10/1984 | Ng et al. | 340/712 |
| 4,661,655 | 4/1987 | Gibson et al. | 178/18 |
| 4,686,332 | 8/1987 | Greanias et al. | 178/19 |
| 4,687,885 | 8/1987 | Talmadge, Jr. et al. | 178/18 |
| 4,734,034 | 3/1988 | Maness et al. | 433/68 |
| 4,752,655 | 6/1988 | Tajiri et al. | 178/18 |
| 4,851,095 | 7/1989 | Scobey et al. | 204/192.12 |
| 5,262,778 | 11/1993 | Saunders | 178/18 |
| 5,289,722 | 3/1994 | Walker et al. | 73/775 |

FOREIGN PATENT DOCUMENTS

| | | |
|---|---|---|
| 61-243622 | 10/1986 | Japan . |
| 3167590 | 7/1991 | Japan . |
| 4230906 | 8/1992 | Japan . |
| 2266595 | 11/1993 | United Kingdom . |

OTHER PUBLICATIONS

Undated brochure entitled "T–Scan™ The Next Generation" by Tekscan, Inc., Boston, MA.

*Primary Examiner*—Hezron Williams
*Assistant Examiner*—Nashmiya Fayyaz
*Attorney, Agent, or Firm*—Workman, Nydegger & Seeley

[57] ABSTRACT

A transparent strain sensitive surface is disclosed which is suitable for strain gages, video terminal touch panels, security panels (windows, display cases, etc.). The strain gage includes a transparent, strain sensitive conductor of indium tin oxide (ITO) or indium oxide (IO) on a transparent substrate. The strain sensitive panels include a crossed xy matrix of transparent IO or ITO strain sensitive conductors formed on the same side or on opposite sides of a transparent substrate.

14 Claims, 6 Drawing Sheets

TRANSPARENT STRAIN SENSITIVE DEVICES AND METHOD

1. CROSS-REFERENCE TO RELATED PATENT(S)

This patent application is related to commonly assigned U.S. Pat. No. 4,851,095, entitled MAGNETRON SPUTTERING APPARATUS AND PROCESS, issued Jul. 25, 1989, to inventors Scobey, Seddon, Seeser, Austin, LeFebvre, and Manley from application Ser. No. 154,177 filed Feb. 8, 1988. This patent application is also related to commonly assigned U.S. Pat. No. 4,361,114, entitled METHOD AND APPARATUS FOR FORMING THIN FILM OXIDE LAYERS USING REACTIVE EVAPORATION TECHNIQUES, issued Nov. 30, 1982, to inventor Gurev from application Ser. No. 260,047 filed May 4, 1981. The '114 and '095 patents are incorporated by reference.

2. BACKGROUND OF THE INVENTION a. Field of the Invention

The present invention relates to discrete thin film strain gauge devices, to devices utilizing strain sensitive surfaces, and to methods of manufacturing such devices.

b. Definition(s)

As used here with reference to the present invention, "transparent" includes non-visual translucent. Also, "transparent" includes "translucent" and vice versa.

c. Current State of the Relevant Technology

To my knowledge, conventional strain measurement technology involves two relevant types of devices.

First, conventional strain gages use a straight or curved conductor element (for example, a serpentine conductor) whose electrical resistance varies with strain or pressure. The opaque sensor element comprises metal wire, semiconductor material or a foil of metal such as copper.

The second application is to strain sensitive surfaces, which may comprise an xy grid of conductors separated by a pressure sensitive, variable resistance film or membrane. The opaque membrane provides variable electrical output (resistance and current) in the circuit paths defined through the membrane at the crosspoints of the opaque x and y conductors. Preferably, the membrane has linearly variable, repeatable resistance as a function of pressure.

U.S. Pat. No. 4,734,034, issued Mar. 29, 1988 to Maness et al, discloses the use of strain surfaces in an occlusal diagnostic device for displaying the points of contact between a patient's upper and lower teeth. The sensor input device comprises top and bottom layers, each containing an array of parallel conductors. The x and y conductors are formed by opaque metal lines or conductive inks and are separated by a conductive/resistive layer. When the flat sensor input device containing the layered composite is positioned in a patient's mouth between the teeth, biting the device compresses the separation layer and this decreases the resistance between an associated crosspoint of the xy conductor arrays. The resistance of the separation layer effects a switching action such that when the resistance is decreased below a threshold value, current flows through the upper and lower conductors at the associated crosspoint causing the associated crosspoint location to be displayed on the system monitor as one of the contact points within an outline of the patient's teeth.

Another example of the application of the xy strain surface technology is in so-called digitizing pads which are used in CAD (computer assisted design) systems. The digitizing pads are used for inputing information such as lines or circles to a computer, which manipulates or otherwise operates on the manually-generated input. Here, as in the above systems, the xy conductors and the supporting resistive layer(s) are opaque.

It is highly desirable to mount such xy-conductor digitizing pads directly on the CRT monitor. Obviously, such an approach requires a large (for example, 14 in. square) strain sensitive transparent device. In addition, it is highly desirable to mount strain or pressure gages on glass panels and windows, for example to provide security for homes, offices, display cases, etc. However, such uses are not practical with the existing strain measurement technology, which uses opaque materials.

To my knowledge, the prior art strain sensitive surface technology is limited to the peripheral conductor approach disclosed in Ng et al U.S. Pat. No. 4,476,463 issued Oct. 9, 1984. The Ng '463 patent uses a peripheral array of electrodes along the different edges of a faceplate (such as a CRT or monitor faceplate) to measure the impedances of the faceplate surface. The peripheral conductors do not interfere with the central viewing area of the faceplate.

3. SUMMARY OF THE INVENTION

The above and other objectives are accomplished in a strain sensitive transparent composite embodying my invention and comprising a transparent substrate having formed thereon at least one transparent electrical conductor, the electrical resistance of the conductor being proportional to the strain or load applied to the conductor. The substrate preferably is a sheet.

In one preferred embodiment, the conductor forms a strain gage. In another preferred embodiment, the composite comprises arrays of conductors formed on one side, or on opposite sides of the substrate, defining an xy grid.

4. BRIEF DESCRIPTION OF THE DRAWINGS

The above and other aspects of the invention are described below in conjunction with the following drawings.

5. DETAILED DESCRIPTION OF THE PREFERRED EMBODIMENT(S)

Figure 1:
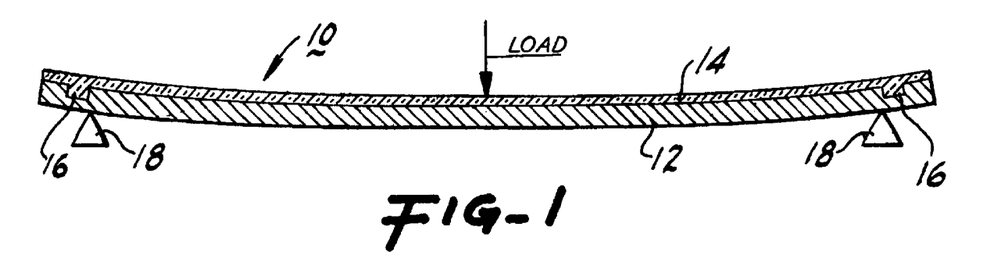
FIG. 1 schematically illustrates a strain sensitive transparent sheet and the technique for applying a load to that sheet to determine the variation in resistance as a function of compressive and tensile stress.

The utility of materials such as indium tin oxide (ITO) and indium oxide (IO) in strain applications of the type described in the "Background of the Invention" was demonstrated and characterized by measuring the change in resistance of a thin strip of ITO coating due to an applied load as follows. Referring to FIG. 1, a commercially available 16 in. square, 0.060 in. thick sheet of glass 12 having a coating 14 of 5 ohms per square ITO formed thereon was masked and sand-blasted to define an ITO strip 0.050 in. wide and 14 in. long. Conductive leads 16—16 were attached to each end of the strip. Loads of about 58 oz. were applied to the composite 10 in directions transverse to the sheet 12 to place the ITO coating 14 in compression or tension and an ohmmeter (not shown) was attached to the leads to measure the resistance of the conductor. The direction of application of the illustrated load in FIG. 1 placed the thin film coating 14 in compression. The results are given below.

|  | Compression | Tension |
| --- | --- | --- |
| No load | 1.10964 kΩ | 1.10988 kΩ |
| Full load | 1.10989 kΩ | 1.10852 kΩ |
| Difference | +0.00025 kΩ | −0.00036 kΩ |

Please note, the compressive and tensile strains unexpectedly resulted in increased and decreased resistance, respectively, the opposite of the behavior of the conventional materials discussed in the Background of the Invention. The measured resistance difference between no load and full compressive and tensile load conditions for the relatively crude 0.050×14 in.>5Ω/□ gage are equivalent to a resistance change of about 300 ppm (parts per million). Changes of this magnitude are readily detected and thus useful in strain gages, touchpanels/digitizing pads, and other strain sensitive devices. Furthermore, the above tensile and compressive strains are approximately symmetric. Symmetry is a desirable but not necessary characteristic in strain materials because of the elimination or reduction of circuitry and/or software necessary to compensate for differences in the response to compressive and tensile strains. It also is expected that more precise devices and instrumentation would demonstrate even greater resistance changes and, perhaps, even greater symmetry. Because of the desirable properties of transparency, strain sensitivity and durability, the composites described here are useful for example as touch panels for inputting information to a computer, in strain sensitive windows such as architectural windows and display case windows in which the strain sensitive surface is used to monitor the pressure and/or strain and/or integrity of the window, and in pressure windows in airplanes, spacecraft, submarines, etc., where, again, the strain sensitive surface is used to monitor the pressure and/or strain and/or integrity of the window.

Figure 2:
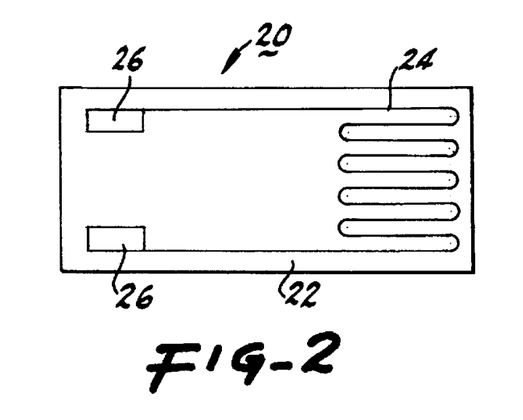
FIG. 2 schematically depicts a transparent strain gauge in accordance with the present invention.

FIG. 2 depicts one embodiment of a strain sensitive device which uses the discovery, discussed above relative to FIG. 1, that transparent ITO (and IO) and similar transparent materials such as alloys of indium oxide and tin oxide, particularly indium-doped tin oxide (ITO) and antimony-doped tin oxide (ATO), as well as aluminum doped zinc oxide (Al:ZnO), have the required load-varied resistance characteristics which make them useful in strain measurement devices. The illustrated device 20 comprises a transparent substrate 22 of glass or plastic such as glass substrates (float glass (preferred), borosilica glass, and silicon dioxide), and plastic substrates (polycarbonate (preferred; G. E. LEXAN) polyester (Dupont MYLAR D), and polyethylene), having a thin film coating of ITO formed to a serpentine strain gage pattern 24 thereon. The ends of the conductor 24 form enlarged pads 26—26 for attaching electrical leads 28—28 to associated monitoring circuitry, FIG. 5. As alluded to above, preferably the transparent strain sensitive material used in my strain sensitive composites is indium tin oxide (ITO). Other materials including indium oxide (IO) are suitable. Preferably the strain sensitive material such as ITO is formed using the sputter deposition, sequential oxidation process described for example in the incorporated '095 patent. Alternatively, other suitable processes include vacuum evaporation, electron beam evaporation and PAS PVD processes such as the PAS electron beam evaporation disclosed in the referenced '114 patent.

Figure 3:
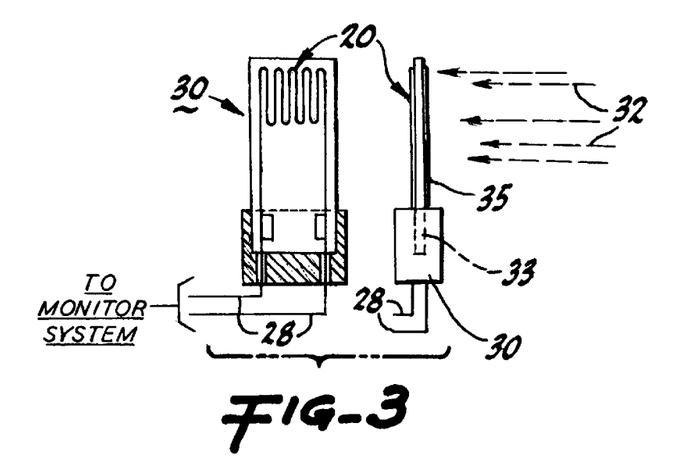
FIG. 3 depicts one application of the strain gauge of FIG. 2, to monitor the thickness uniformity of a depositing thin film.

FIG. 3 illustrates the use of the strain gage 20, FIG. 2, to monitor the stress in a depositing thin film. Here, the gage 20 is joined to the back of the substrate 33 on which material 32 is (being) deposited, forming thin film 35. The strain gage is connected via leads 28—28 to the monitoring system described below relative to FIG. 5. During deposition of the thin film 35, strain gage 20 monitors stress across the film in a manner well known in the art and which, thus, is not described in detail here. Please note, it is necessary that the strain gage composite 20 be securely joined to the substrate 33. Suitable joining techniques include screws (preferred), mechanical clamping, welding, brazing, and adhesive bonding. A transparent strain gage is more desirable in the in-situ film stress monitoring applications where it is desirable to also monitor layer thickness with an optical monitor.

Figures 4A, 4C:
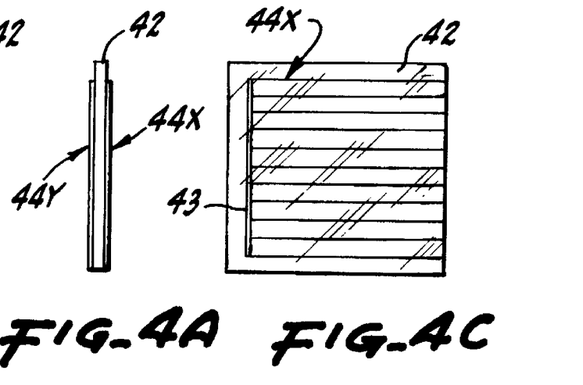
FIGS. 4A through 4C schematically depict a transparent strain sensitive surface in accordance with the present invention, comprising an xy grid of transparent conductors formed on a transparent substrate.
Figure 4B:
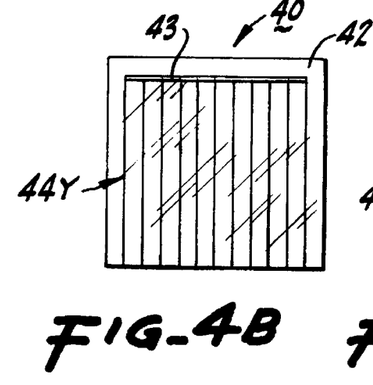

FIGS. 4A–4C depict one example of a transparent composite 40 comprising an xy grid of conductors 44X and 44Y formed on a substrate 42. The device 40 differs from conventional devices in that preferably the conductor arrays 44X and 44Y and the substrate 42 are all transparent.) Specifically, a transparent glass or plastic substrate 42 is coated on opposite sides with a transparent conductive coating 44 of material such as ITO. The coatings can be deposited by various processes, such as sputtering and oxidation, or electron beam evaporation (with or without PAS) and oxidation. For temperature sensitive substrate materials such as plastics, assignee's above-referenced '095 patent process process is preferred. To form the composite 40, the coatings are deposited, either sequentially or simultaneously, then one of the coatings is masked and etched, to form the thin conductor lines 44X or 44Y. The opposite coating is then masked and etched to form the perpendicular array 44Y or 44X. Alternatively, both coatings can be masked before they are etched. Other patterning techniques such as laser oblation, and different deposition, masking and removal sequences, can be used.

Alternatively, both sets of conductors can be formed on the same side of the substrate 42 with an intervening transparent insulating layer. In this alternative, one of the coatings is deposited and patterned, a transparent insulating layer such as silicon oxide is deposited, then the second coating is deposited and patterned.

Figure 5:
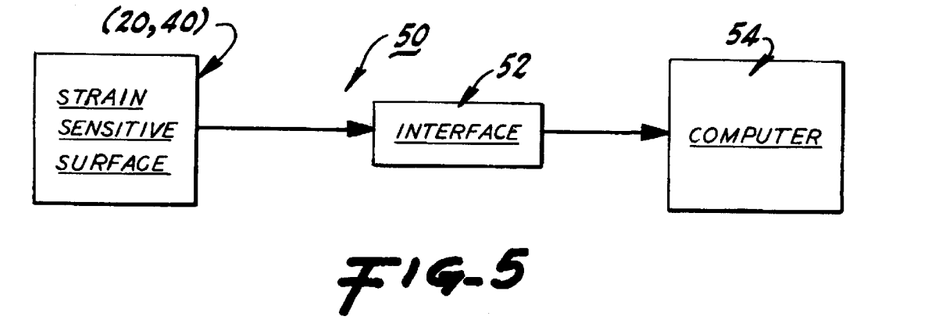
FIG. 5 is a block diagram schematically illustrating a system for monitoring pressure or strain using the strain gauge of FIGS. 2 and 3 or the xy grid, strain sensitive surface of FIGS. 4 and 6 through 9.
Figure 6:
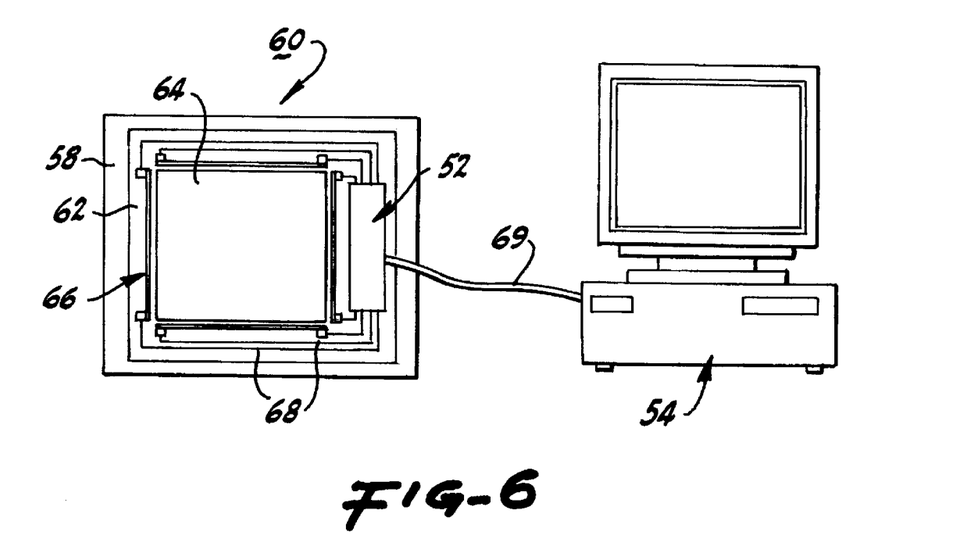
FIG. 6 schematically depicts a system for monitoring strain or pressure which is applied to a strain sensitive surface comprising an xy grid of pressure sensitive, variable resistance conductors.

The FIG. 5 block diagram generically depicts a system 50 comprising interface electronic circuit 52 and computer 54, for monitoring the magnitude and/or the magnitude and location of the pressure or strain in a strain sensitive surface such as the strain gage 20 and the xy grid device 40. FIG. 6 is a more detailed schematic of a system 60 for monitoring the magnitude and/or the magnitude and location of the pressure or strain of an xy grid device. Specifically, the strain sensitive xy grid device, which is mounted on a window 58 or other surface to be monitored, comprises transparent substrate 62, active surface 64 surrounded by four sensors 66—66, and interconnect wires 68—68 connected to interface electronics circuit 52, which in turn is connected via cable 69 to computer 54. The computer 54 receives the amplified, digitized electrical signals from the interface circuit 52 and, as is well understood in the art, provides output information in electronic, visual, magnetic, paper, etc. media regarding the magnitude and/or location of the load applied to the strain sensitive surface. Alternatively, (for example, where the strain sensitive surface is a digitizer pad), the computer uses the electronic signals as input to an applications program such as a CAD program.

Figure 7:
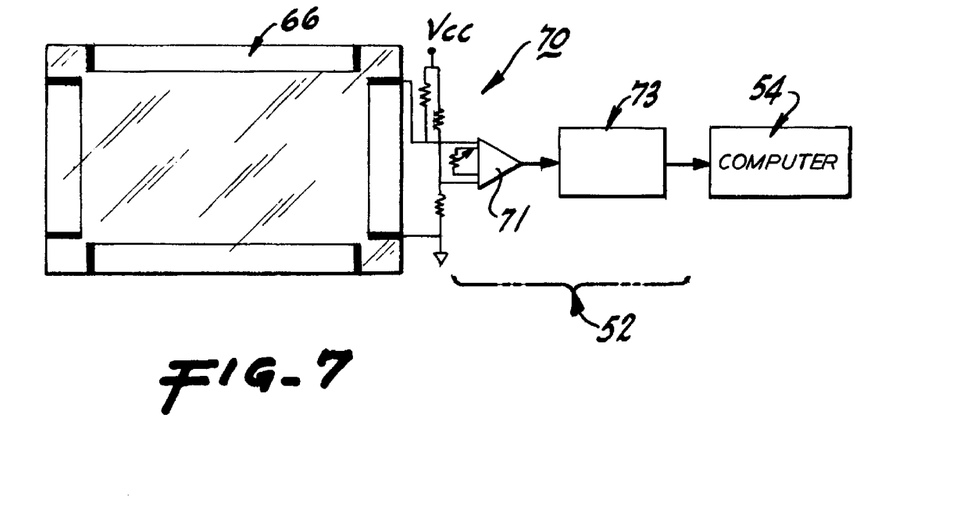
FIG. 7 is a simplified schematic corresponding to the generic system depicted in FIG. 5, providing added detail regarding the interface electronics and illustrating a particular embodiment of the xy conductor grid.

FIG. 7 illustrates with greater detail one exemplary arrangement of an interface circuit 52 comprising an amplifier 71 and an A/D converter 73. FIG. 7 also depicts a strain sensitive surface in the form of a strain gage 66 which uses a very simple strain gage pattern. The pattern comprises a glass substrate with thin grid lines on the top, bottom, and sides. The grid is connected at either end to heavier, nearly strain insensitive, tabs which facilitate soldering to leadwires. This soldering has been successfully done using ultrasonic soldering techniques. For example, soldering copper wire or foil to ITO is accomplished using solder containing an indium alloy such as that available from Arconium Corp of America under the tradename/product identification OST 298-300 (80%indium/15%lead/5%silver). The solder is fed into an ultrasonic soldering machine, one example being a Sunbonder USM III from Asahi Glass Ltd.

Each gage can be connected into a Wheatstone bridge, as previously described, amplified at 71, converted to a digital signal at 73, and sent for processing to computer 54. Only one gage is shown with the electrical connections.

Figure 8:
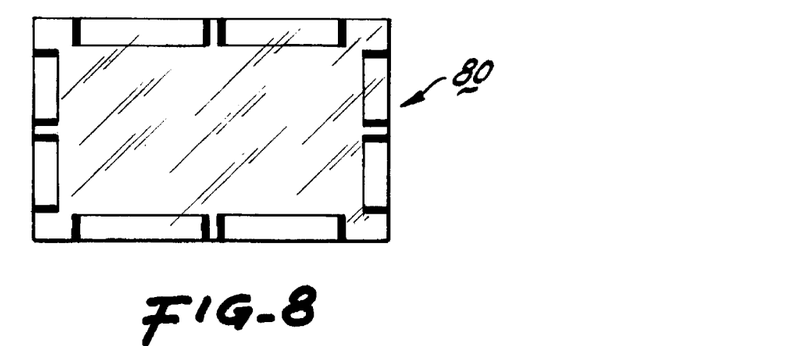
FIGS. 8 and 9 are simplified schematics of strain sensitive xy grids which are alternatives to that depicted in FIG. 7.
Figure 9:
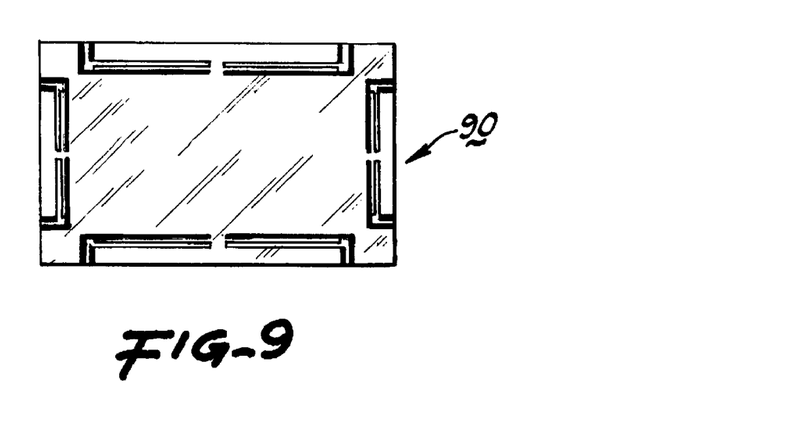
Figure 10:
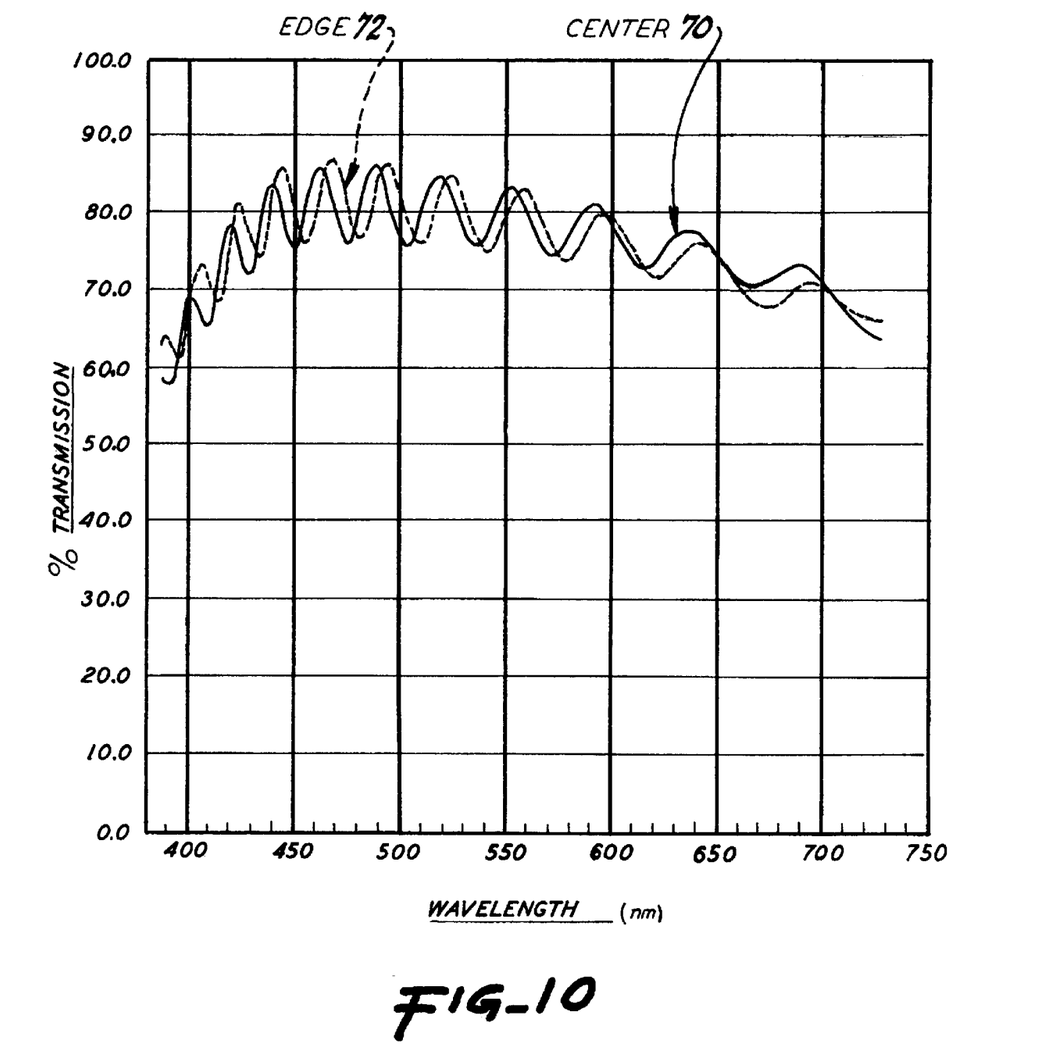
FIG. 10 depicts the transmittance characteristics of an exemplary strain surface, identified as Example 1 here.

To improve the resolution of the strain sensitive surface, more gauges could be constructed, as shown in FIG. 8. This process could be extended to as many gauges as desired. To increase the sensitivity of each individual gauge, a looping could be done as shown in FIG. 9. The sensitivity or "gage factor" can be increased by increasing the length and decreasing the width of each gauge element.

Figure 12:
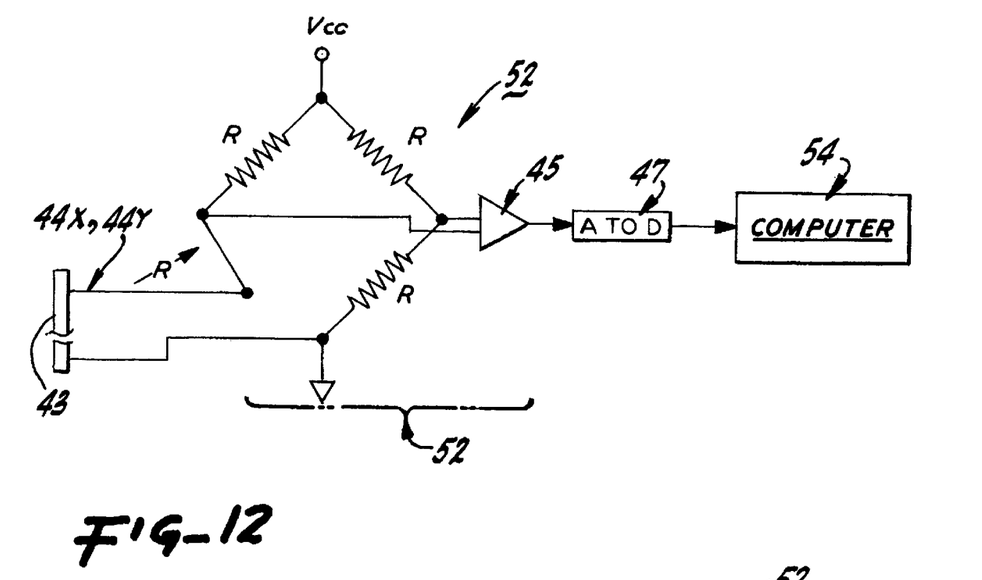
FIGS. 12 and 13 depict a Wheatstone bridge sensing circuit for the strain sensitive conductors of FIG. 4.

FIG. 12 is a more-detailed schematic depiction of a suitable Wheatstone bridge interface circuit 52, one which incorporates or integrates the strain sensitive conductor/surface as one side of the bridge, for the purpose of monitoring the variation in pressure/strain in strain sensitive components such as the strain gage conductor 24, FIG. 4 and the strain sensitive conductors/conductor array/surfaces of FIGS. 4 and 7–9. Considering the FIG. 12 circuit 52 with specific reference to the FIG. 4 xy array, a conductor 44X or 44Y is connected via bus bar 43 as the variable resistor/impedance with three known, equal-valued resistors R. Illustratively, the output of the bridge is connected to amplifier 45, and the resulting amplified output is applied as input to an analog-to-digital converter 47 which, in turn, is connected to computer 54.

Figure 13:
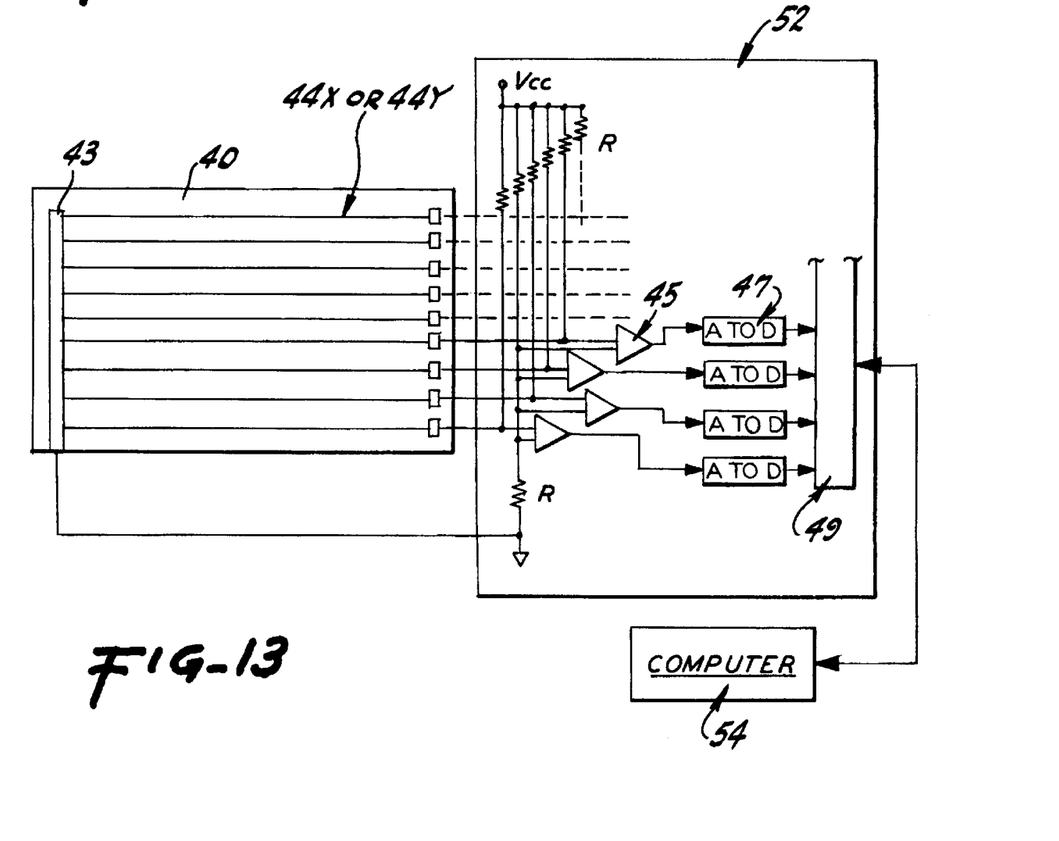

FIG. 13 depicts one application of the FIG. 12 circuit, to a multi-conductor strain sensitive surface such as 40. Each 44X or 44Y conductor is incorporated into a bridge circuit as described in FIG. 12. In order to accommodate the multiple bridge circuits, a multiplexer 49 is inserted between the output of the analog-to-digital converters 47 associated with the different bridge circuits and the computer input.

Strain Surface Operating Procedure

Consider now an exemplary operating procedure, using the system of FIG. 7 as an example. To calibrate the system, first, all gages are read, and these readings are stored as ZERO values (nulling the initial bridge unbalance). The designed full scale weight is then placed in the very center of the surface and all gauges are read and stored as FULL SCALE. If desired, one half of the full scale weight can be substituted for the full scale weight, readings taken and stored as HALF SCALE readings to correct for non-linearity. All subsequent readings can now be referred to the ZERO and FULLSCALE values.

When the full scale weight is placed at various positions around the surface the following normalized reading (in millivolts at the input to the amplifier with a ten volt excitation) would be typical:

| Weight Position | Top Gauge Reading | Bottom Reading | Left Reading | Right Reading |
|---|---|---|---|---|
| None | 0 | 0 | 0 | 0 |
| Center | 5 | 5 | 5 | 5 |
| Top | 9 | 1 | 5 | 5 |
| Bottom | 1 | 9 | 5 | 5 |
| Left | 5 | 5 | 9 | 1 |
| Top Right | 9 | 1 | 1 | 9 |

When a half scale weight is placed at various positions around the surface the following normalized readings (in millivolts at the input to the amplifier with a ten volt excitation) would be typical:

| Weight Position | Top Gauge Reading | Bottom Reading | Left Reading | Right Reading |
|---|---|---|---|---|
| None | 0 | 0 | 0 | 0 |
| Center | 2.5 | 2.5 | 2.5 | 2.5 |
| Top | 4.5 | 0.5 | 2.5 | 2.5 |
| Bottom | 0.5 | 4.5 | 2.5 | 2.5 |
| Left | 2.5 | 2.5 | 4.5 | 0.5 |
| Top Right | 4.5 | 0.5 | 0.5 | 4.5 |

By reading all four gages, scaling, and performing the calculations; it is possible to accurately determine both the position and the magnitude of the applied force.

The following examples give representative parameters for processes and devices which embody my invention.

EXAMPLE 1

Transparent Strain Gage (FIG. 2)

An 18 kA° thick coating of indium tin oxide (ITO) is formed by depositing ITO by electron beam evaporation, using the process summarized in Table 1, on a float glass substrate 0.5 in. wide by 1.0 in. long by 0.010 in. thick. The evaporation process of Table 1 does not use a plasma activated source (PAS), but PAS can be used. (Alternatively, as described below, the process described in the referenced '095 patent could be used) Using conventional masking and etching, the ITO layer is formed to a standard serpentine pattern conductor 0.05 in. wide (transverse width) using standard masking and etching steps. Then, silver paint bonding pads are coated on the ends of the conductor for external electrical connection. Alternatively, an insulating/passivation layer is formed over the assembly for the purpose of mechanical protection and/or humidity protection. For example, a silicon dioxide layer one micron (micrometer) thick deposited by the well-known electron beam PVD process serves the above described protective functions. The resulting strain gage is transparent to visible radiation.

TABLE 1

Electron Beam Evaporation

| | |
|---|---|
| Substrate: | Float Glass |
| Rotary Motion: | Double |
| Material co-evaporation | |
| Source 1 Sn (tin) | |
| Source 2 In (Indium) | |
| C.R. (Cathode rate): | 1–2 Å/s |
| Gas: | Oxygen 400 sccm |
| Power: | Indium Power 6.0 KV .3 Amps |
| | Tin Power 6.0 KV .3 Amps |
| Evaporation Pressure: | 0.1 microns |
| Process Temp: | 300° C. |
| Post Operation Bake: | None |

EXAMPLE 2

Figure 11:
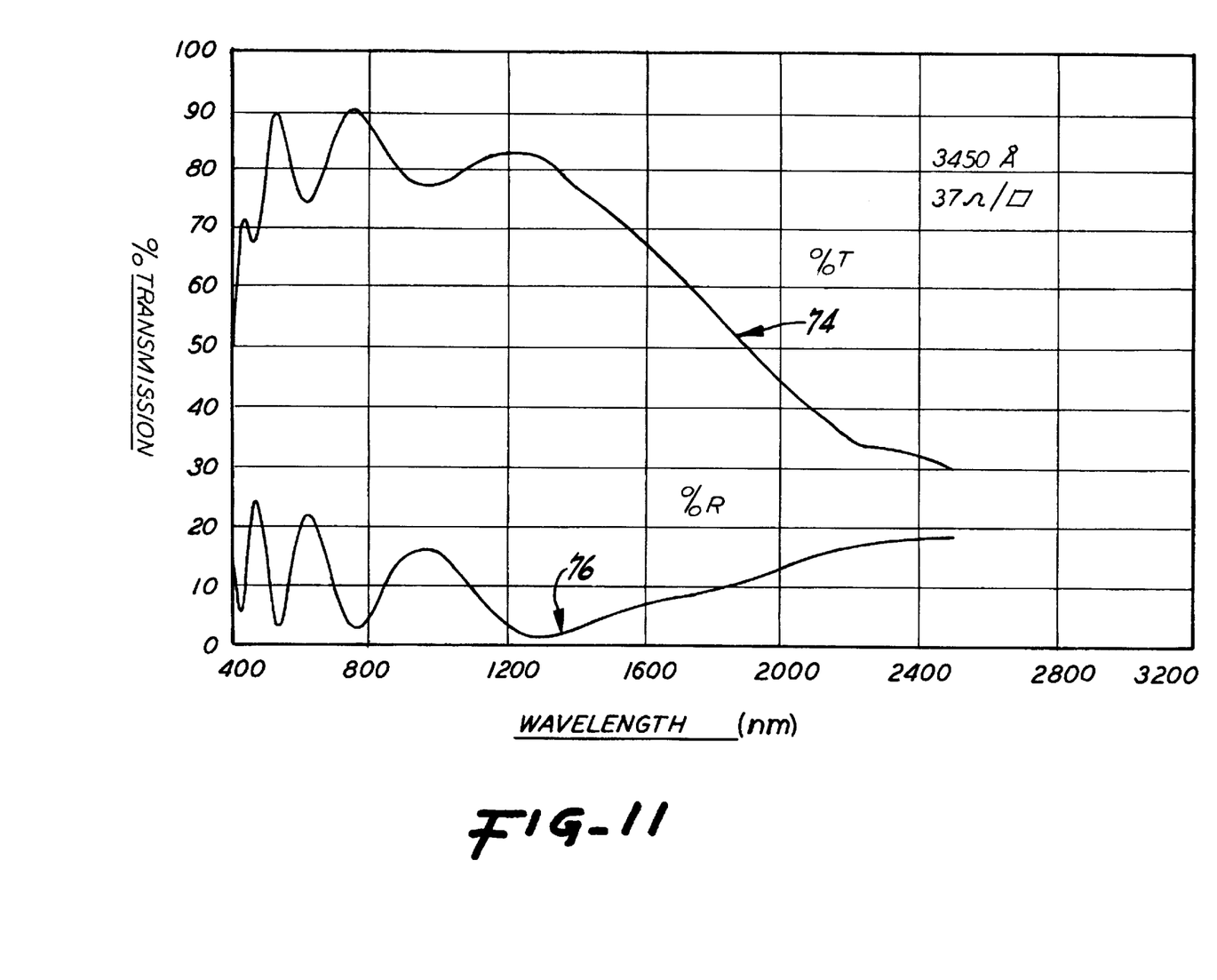
FIG. 11 depicts the transmittance characteristics of an exemplary surface formed by PAS PVD (plasma-assisted source, physical vapor deposition).

Transparent Video Terminal Touch Panel (FIG. 4) Using Scobey et al '095 Technology 10 ohms per square ITO coatings ~0.020 in. on a side and ~0.7 microns thick are formed on opposite sides of a 12 in. square, 0.060 in. thick substrate of float glass, using the process summarized in Table 2. Using conventional masking and etching, the ITO layer is formed into an array of close spaced parallel conductor lines interconnected at each end by a bus line. The arrays are oriented perpendicular to one another, that is, they form an xy grid. The conductor lines are ~0.020 in. wide by ~9.0 in. long, while the bus lines are ~0.100 in. wide by ~10.0 in. long. The resulting touch/pad can be mounted directly to a CRT or other monitor or display by 0.020 stand-offs at each corner or can be mounted in a plastic bezel added to a finished computer terminal similar to the GLAREGUARD® anti-glare panels. Touching the pad changes the resistance of the underlying ITO conductors, thereby altering the current through the conductors at the crosspoint(s), allowing an associated computer to define the xy position of contact, as well as the "z" axis or magnitude of force. The resulting strain sensitive touch panel is transparent to visible radiation and has the transmittance characteristics depicted in the FIG. 11 wave/length scan for 3.45 kÅ thick, 37.0 ohms per square ITO formed using the process described in the incorporated '095 patent.

TABLE 2

ITO PER PROCESS OF THE '095 PATENT

| | |
|---|---|
| Substrate: | Polycarbonate |
| Rotary Motion: | Single |
| Material: | Indium tin alloy to form ITO |
| C.R.: | 3–6 Å/s |
| Gas: | Argon 600 sccm |
| Power: | 2.5 KW |
| Argon Sputter Pressure: | 2.5 microns |
| Ion Source Operation: | 3.0 amps; 280 sccm $O_2$ |
| Post Operation Bake: | None |

EXAMPLE 3

Transparent Video Terminal Touch Panel (FIG. 4) Using PAS E-Beam Evaporation (Gurev '114)

10 ohms per square ITO coatings ~0.020 in. on a side and ~0.7 microns thick are formed on opposite sides of a 12 in. square, 0.060 in. thick substrate of float glass, using electron beam evaporation with PAS, the evaporation process of TABLE 1, with the PAS assist described for example in the incorporated Gurev '114 patent. Without PAS, the process involves flowing oxygen into the chamber and allowing it to react with the evaporated tin and indium to form ITO. Using the PAS process involves flowing oxygen into the chamber through the PAS unit as described in the Gurev '114 patent. RF energy is coupled into the oxygen stream exciting the oxygen to higher energy states. The excited oxygen is significantly more reactive and results in better oxidation of the indium, resulting in ITO having lower sheet resistance than is formed using non-PAS electron beam evaporation.

Using conventional masking and etching, the ITO layer is formed into an array of close spaced parallel conductor lines interconnected at each end by a bus line. The arrays are oriented perpendicular to one another, that is, they form an xy grid. The conductor lines are ~0.020 in. wide by ~9.0 in. long, while the bus lines are ~0.100 in. wide by ~10.0 in. long. The resulting touch/pad can be mounted directly to a CRT or other monitor or display by 0.020 stand-offs at each corner or can be mounted in a plastic bezel added to a finished computer terminal similar to the GLAREGUARD® anti-glare panels. Touching the pad changes the resistance of the underlying ITO conductors, thereby altering the current through the conductors at the crosspoint(s), allowing an associated computer to define the xy position of contact, as well as the "z" axis or magnitude of force. The resulting strain sensitive touch panel is transparent to visible radiation and has the transmittance characteristics depicted in the FIG. 11 wave/length scan for 28.8 kÅ thick, 0.91 ohms per square plasma activated source (PAS) assisted electron beam evaporation formed ITO.

TABLE 3

Electron Beam Evaporation with PAS

| | |
|---|---|
| Substrate: | Float Glass |
| Rotary Motion: | Double |
| Material co-evaporation | |
| Source 1 Sn (tin) | |
| Source 2 In (Indium) | |
| C.R. (Cathode rate): | 1–2 Å/s |
| Gas: | Oxygen 400 sccm |
| Power: | Indium Power 6.0 KV .3 Amps |
| | Tin Power 6.0 KV .3 Amps |
| Evaporation Pressure: | 0.1 microns |
| Process Temp: | 300° C. |
| Post Operation Bake: | None |
| Plasma-Activated Source (PAS): | |
| Frequency: | 13.56 MHz |
| Incident Power: | 1.8 KW |

EXAMPLE 4

Transparent Video Terminal Touch Panel

This touch panel is the same as that of Example 2, except that the crossed conductor coatings are formed on the same side of the substrate, separated by an insulating later. One ITO conductor coating about 0.7 microns thick is deposited and patterned, including forming bonding pads on the conductor ends; then a 1.0 micron thick insulating coating of silicon dioxide is deposited; and the second ITO conductor coating, about 0.7 micron thick, is deposited and patterned and bonding pads are formed. A passivation/insulating coating of SiO$_2$ material, 1–2 micron thick is deposited over the assembly.

EXAMPLE 5

Transparent Video Terminal Touch Panel on Flexible Plastic Base

This touch panel is the same as that of Example 2 except that the low temperature process described in the incorporated '095 patent is used to form the coatings on a plastic substrate. Here, the substrate is a flexible plastic material such as polycarbonate. The touch panel is formed as described in Example 2 using the process described in the referenced Scobey, Seddon et al. patent, U.S. Pat. No. 4,851,095, to form the ITO coatings and, preferably, the silicon dioxide passivation or protective coatings. The advantages of the process described in the incorporated '095 patent include low temperature processing, which permits the use of materials such as plastics having low melting and/or softening temperatures, in turn permitting the use of a touch panel which is flexible as well as translucent/transparent and, thus, suitable for mounting on curved surfaces such as curved monitor viewing screens.

Based upon the above description and examples, those of usual skill in the art will readily practice the invention set out in the claims defined below.

I claim:

1. A strain sensitive device providing, 3-axis strain sensing, comprising one translucent or transparent electrical insulator substrate, said one substrate comprising a first major surface having at least a first region and a second region; a conductor array comprising translucent or transparent thin film electrical conductors formed on the first region but not on the second region of the first major surface of said one substrate, the conductors being deflectable when a force is applied to as well as when a force is applied to the first region or the second region of said substrate to thereby produce an electrical resistance or resistivity in said conductors proportional to strain in said conductors as a result of the force applied to the first region or the second region; and sensing means connected to said conductors on the first major surface on said one substrate and responsive to the strain-induced electrical resistance or resistivity change in said conductors for determining the xy location and amplitude of the applied force in the first or second region.

2. The strain sensitive device of claim 1, wherein the insulator substrate is a sheet.

3. The strain sensitive device of claim 1, wherein said conductors form a strain gage.

4. The strain sensitive device of claim 2, wherein the first region is an edge region and the second region is an interior region of the first major surface of said substrate, and said conductor array being disposed in the edge region proximate at least one edge of said substrate but not at the interior region thereof.

5. The strain sensitive device of claim 2, wherein the first region is a peripheral edge region circumscribing the second region defining an interior region of the first major surface of said substrate, and said conductor array being disposed in the peripheral edge region proximate at least two edges of said substrate but not at the interior region thereof.

6. The strain sensitive device of claim 1, wherein the conductor array comprises a discrete plurality of conductor strips in the first region circumscribing the second region devoid of said conductor strips, said conductor strips capable of sensing the xy position and magnitude of forces applied in the second region as well as in the first region.

7. The strain sensitive device of any of claims 1–5, wherein the device comprises a viewing window or pressure window.

8. The strain sensitive device of any of claims 1–5, wherein said conductors comprise indium tin oxide.

9. The strain sensitive device of any of claims 1–5, wherein said conductors comprise indium oxide.

10. The strain sensitive device of any of claims 1–5, wherein the device comprises a touch panel.

11. The strain sensitive device of claim 10, wherein said conductors comprise indium tin oxide.

12. The strain sensitive device of claim 10, wherein said conductors comprise indium oxide.

13. The strain sensitive device of claim 7, wherein said conductors comprise indium tin oxide.

14. The strain sensitive device of claim 7, wherein said conductors comprise indium oxide.

* * * * *

UNITED STATES PATENT AND TRADEMARK OFFICE
CERTIFICATE OF CORRECTION

PATENT NO. : 5,915,285
DATED : Jun. 22, 1999
INVENTOR(S) : Thomas R. Sommer

It is certified that error appears in the above-identified patent and that said Letters Patent is hereby corrected as shown below:

Col. 4, line 45, after "42." change "The" to --(The--

Col. 4, line 55, after "patent" delete the second occurrence of "process"

Col. 4, line 62, after "laser" change "oblation" to --ablation--

Col. 6, line 12, after "bridge" change "unbalance" to --imbalance--.

Col. 6, line 64, after "used" insert a period

Col. 9, line 41, after "applied to" insert --the first region--

Col. 9, line 42, before "the second" delete "first region or"

Signed and Sealed this

Fourth Day of July, 2000

Attest:

Attesting Officer

Q. TODD DICKINSON
Director of Patents and Trademarks